United States Patent [19]

Stang et al.

[11] 4,348,991
[45] Sep. 14, 1982

[54] DUAL COOLANT ENGINE COOLING SYSTEM

[75] Inventors: John H. Stang; David A. Ruthmansdorfer; Dean H. Reichenbach, all of Columbus, Ind.

[73] Assignee: Cummins Engine Company, Inc., Columbus, Ind.

[21] Appl. No.: 197,518

[22] Filed: Oct. 16, 1980

[51] Int. Cl.³ .................... F01P 7/14; F02B 29/04
[52] U.S. Cl. ..................... 123/41.29; 123/41.42; 123/41.44; 123/563; 60/599
[58] Field of Search ............ 123/41.01, 41.29, 41.31, 123/41.42, 41.55, 41.82 R, 196 AB, 41.44, 563; 60/599

[56] References Cited

U.S. PATENT DOCUMENTS

| | | | |
|---|---|---|---|
| 1,774,881 | 9/1930 | Fry | 123/41.02 |
| 2,085,810 | 7/1937 | Ljungstrom | 123/170 |
| 2,188,172 | 1/1940 | Brehob | 123/196 |
| 2,446,995 | 8/1948 | Bay | 123/178 |
| 2,748,562 | 6/1956 | Kauffmann | 60/599 |
| 2,944,534 | 7/1960 | Hodkin | 123/41.31 |
| 3,127,879 | 4/1964 | Giacosa et al. | 123/41.72 |
| 3,134,371 | 5/1964 | Crooks | 123/41.31 |
| 3,444,845 | 5/1969 | Scheiterlein | 123/41.82 |
| 3,687,232 | 8/1972 | Stenger | 123/41.42 |
| 3,731,660 | 5/1973 | Leffert | 123/41.42 |
| 3,752,132 | 8/1973 | Bentz et al. | 123/41.1 |
| 3,863,612 | 2/1975 | Wiener | 123/41.08 |
| 3,872,835 | 3/1975 | Deutschmann | 123/41.31 |
| 4,000,725 | 1/1977 | Harris | 60/611 |
| 4,061,187 | 12/1977 | Rajasekaran et al. | 123/41.29 |
| 4,249,491 | 2/1981 | Stein | 123/196 AB |

FOREIGN PATENT DOCUMENTS 2000223 1/1979 United Kingdom .

Primary Examiner—William A. Cuchlinski, Jr.
Attorney, Agent, or Firm—Sixbey, Friedman & Leedom

[57] ABSTRACT

A dual loop cooling system for an internal combustion engine including a first loop or circuit (36) employing engine lubrication oil for cooling the engine cylinder and a second loop or circuit (48) employing water for cooling the aftercooler and engine head. A first flow control valve (72) and heat exchanger (54) operate to maintain an ideal temperature for the lubrication oil in the range of 200°–250° F. A radiator (86) and second flow control valve (94) in the second circuit (48) operate in response to engine output torque to cause the intake air to be at its lowest temperature at maximum engine output torque and to be at its highest temperature at minimum engine output torque. In one embodiment, the control valve (94) responds to engine water outlet temperature as determined by sensor (104). In another embodiment, a control valve (94') responds to intake manifold air pressure as determined by sensor (106). In yet another embodiment, valve (94") responds to compressor discharge air temperature as determined by sensor (108) to produce the desired transient response.

12 Claims, 4 Drawing Figures

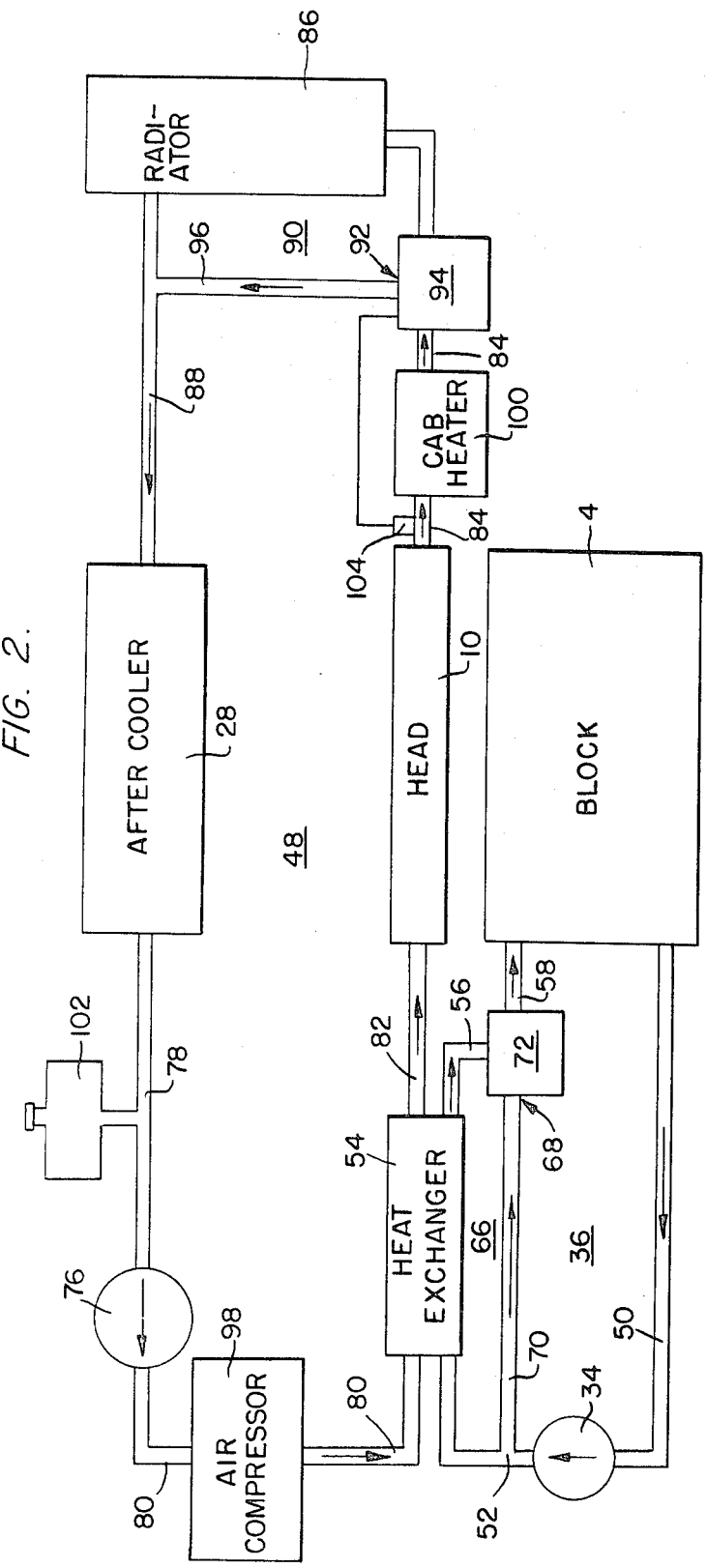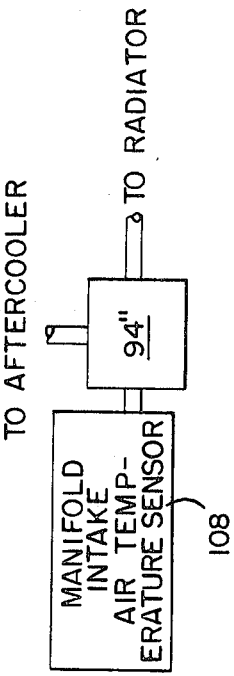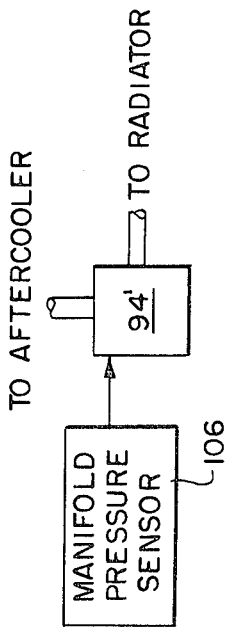

DUAL COOLANT ENGINE COOLING SYSTEM

DESCRIPTION

1. Technical Field

This invention relates to cooling systems employing dual coolant circuits for use in internal combustion engines particularly heavy duty internal combustion engines of the compression ignition type.

2. Background Art

Engine designers have long recognized that the efficiency of an internal combustion engine can be improved by controlling carefully the operating temperature of the engine and the air charge supplied thereto. More recently, intense engineering efforts devoted to the study of emission control techniques have shown that temperature control is also important to the abatement of certain types of undesired emissions. Unfortunately, the ideal temperature for achieving maximum efficiency as well as emission abatement is not the same for all operating conditions of the engine nor is it the same for all engine components and air charge. As these facts have become manifest, engine designers have resorted to ever more complicated engine cooling systems in an attempt to achieve the desired results.

The problem of complexity is particularly acute when the engine is turbocharged since such engines generally require an aftercooler for reducing the discharge air temperature of the compressor. Such aftercoolers normally use engine coolant as a recipient heat transfer medium, thereby further complicating the engine cooling system. In the normal single circuit-type cooling system, the coolant is often not below approximately 170° at the coolest point in the circuit after the engine has reached its normal operating temperature. Such a temperature is not sufficiently low for ideal aftercooler operations under certain engine operating conditions.

If the coolant supplied to the aftercooler could be reduced in temperature, further improvement in engine efficiency would be possible. Unfortunately reduction in the normal operating temperature of the engine coolant can have deleterious effects on the engine because in some engines under certain operating conditions, the engine coolant is needed to provide heat to the engine's lubrication oil. The need to heat lubrication oil derives in part from the fact that some combustion gases in minute quantities (called blow-by gases) will always leak past the piston rings into the engine crankcase. If the lubrication oil within the crankcase is not at a sufficiently high temperature, the blow-by gases will be condensed in the lubrication oil and will form highly detrimental acids and sludge. Heating of lubrication oil is also desirable because oil becomes excessively viscous at lower operating temperatures thereby reducing efficiency by causing excessive power consumption by the lubrication pump (referred to as parasitic pumping loss). Ideally, the operating temperature of the lubrication oil in most engines should be in the 200°-250° F. range. For example, commercial engines manufactured by the assignee of this application achieve overall optimum operating conditions when the lubricating oil is in the 210°-230° F. range.

To assist in minimizing parasitic pumping losses and reduce acid/sludge formation in the lubrication oil, engine coolant is used to heat the lubrication oil through special heat exchangers referred to as "oil coolers". Examples of such heat exchangers are disclosed in U.S. Pat. Nos. 2,188,172 to Brehob and 2,446,995 to Bay. These devices are designed to take advantage of the fact that engine coolant tends to warm up much faster than lubrication oil when the engine is first started. In particular, oil coolers are designed to pass the lubrication oil in heat exchange relation with the engine coolant during warm up of the engine thereby causing the cold lubrication oil to be heated by the engine coolant. Under certain operating conditions of a vehicle mounted engine, such as prolonged high speed, highway operation, the lubrication oil temperature will tend to drop below the temperature at which acid/sludge formation becomes a more serious problem. Under such conditions the oil cooler is normally used continuously to heat the lubrication oil by causing heat to flow from the higher temperature engine coolant into the lubrication oil.

It can thus be seen that for some purposes, such as efficient aftercooler operation, it would be desirable to operate the cooling system of an internal combustion engine to provide the lowest possible coolant temperature. For other purposes, such as efficient oil cooler operation, the engine coolant should be operated at a much higher temperature to assist in achieving and maintaining the ideal lubrication oil temperature. This dilemma can be alleviated to some degree by using coolant from a lower temperature portion of the cooling system for the aftercooler and coolant from a higher temperature portion of the cooling system for the oil cooler. In more sophisticated engine cooling systems such as disclosed in U.S. Pat. Nos. 4,061,187 to Rajasekaran et al.; 3,872,835 to Deutschmann; 3,863,612 to Weiner; 3,752,132 to Bentz; 3,134,371 to Crooks; and 1,774,881 to Fry, separate coolant circuits are provided allowing one circuit to operate at a higher temperature than does the other. Dual coolant circuit systems solve some of the problems associated with the need to provide both high and low temperature coolant to different components of an engine but in so doing, other problems are created. For example, dual coolant circuit systems are more expensive to manufacture and maintain. In addition, such systems add to the overall weight of the engine and may even contribute to the total parasitic pumping losses involved in moving fluid through more complex fluid flow paths.

Dual coolant circuit systems known heretofore have also not been able to eliminate the smoke sometimes emitted by a turbocharged and aftercooled engine when the throttle is advanced. As discussed in U.S. Pat. No. 4,000,725 to Harris, the smoke emission problem is especially acute immediately after an engine has undergone a prolonged idling period. The theory for this phenomena propounded in the Harris patent is that the engine accelerates faster than the turbocharger and causes the intake air to be heated to some degree rather than cooled by the aftercooler. In an attempt to solve this problem, the Harris patent discloses means for reducing the amount of aftercooler heating of the intake air by reducing coolant flow through the aftercooler during engine idling periods.

Despite the cooling system refinements discussed above, the fuel efficiency and emission abatement performance of internal combustion engines still remains below the ideal. In an attempt to overcome many of the disadvantages associated with the use of water as an engine coolant numerous suggestions have been made in the past for using engine lubrication oil as a coolant medium in an internal combustion engine. Examples of such suggestions are contained in U.S. Pat. Nos. 2,085,810 to Ljungstrom; 2,944,534 to Hedkin; 3,127,879 to Giacosa et al.; and 3,687,232 to Stenger and United Kingdom Pat. No. 2,000,223. Such systems have never enjoyed widespread commercial use for a variety of reasons based primarily on the fact that oil has a smaller specific heat and higher viscosity as compared to water and thus does not provide sufficient cooling effect when employed in a conventional water flow circuit.

DISCLOSURE OF THE INVENTION

It is an object of this invention to overcome the disadvantages of the prior art by providing an internal combustion engine cooling system which functions to improve fuel consumption and power output while simultaneously abating smoke, unburned hydrocarbon and nitric oxide emission.

Another object of this invention is to provide a cooling system for a turbocharged engine including an aftercooler operated in a manner to heat the intake air at low engine output torque thereby reducing white smoke emission and/or unburned hydrocarbon and to cool intake air at high engine output torque thereby improving peak output power, fuel efficiency and nitric oxide emission abatement.

A more specific object of this invention is to provide a dual circuit cooling system involving less parasitic pumping loss wherein the coolant in one circuit is water and the coolant in the other circuit is the engine lubrication oil and wherein the coolant temperatures are carefully regulated to provide optimum heating and cooling effects to the engine components arranged in heat exchange relationship therewith to improve fuel consumption and to reduce white smoke, unburned hydrocarbon and nitric oxide emission as well as sludge build up in the lubrication oil.

Yet another object of this invention is to provide a cooling system for a turbocharged and aftercooled internal combustion engine wherein the water coolant temperature is regulated by a temperature control mechanism designed to cause air entering the intake manifold to have its lowest temperature at maximum engine torque and its highest temperature at zero engine torque. the disclosed cooling system achieves this result by responding to the engine torque output in some manner to adjust the temperature of the coolant supplied to the aftercooler to be highest at zero torque and lowest at maximum torque. The engine torque sensor may be responsive to the temperature of coolant leaving the engine, to the intake manifold pressure, to compressor air discharge temperature to fuel rail pressure or fuel pump rack position.

A more specific object of this invention is to provide a water/oil cooling system for a turbocharged and aftercooled internal combustion engine wherein the water circuit passes through the aftercooler and head portion of the engine to cool the engine intake air and head while the oil circuit passes only through the block portion of the engine in heat exchange relation with the engine cylinders to cool the engine cylinders and maintain the lubrication oil temperature at the desired level. The water coolant temperature is regulated to cause the intake air leaving the aftercooler to have its lowest temperature at maximum engine torque and its highest temperature at zero torque and the lubrication oil temperature is regulate to maintain the engine block temperature at a high and stable level under substantially all operating conditions.

A still more specific object of this invention is to provide a cooling system employing engine lubrication oil arranged to remove heat from the engine pistons and cylinder liners to cause the engine lubrication oil supplied to the engine bearings to be maintained at a temperature of 210°–230° F. during substantially all engine operating conditions following warm up. A heat exchanger links the oil lubrication circuit in heat exchange relationship with a separate water coolant circuit and is operated to allow heat to flow only from the lubrication oil into the water coolant. The desired lubrication oil temperature is achieved and maintained primarily by causing the oil to pass in heat exchange relationship with the engine cylinders.

Still other and more specific objects of the invention may be appreciated from the following Brief Description of the Drawings and Best Mode for Carrying Out the Invention.

BRIEF DESCRIPTION OF THE DRAWINGS

FIG. 2 is a more detailed schematic diagram of the cooling system illustrated in FIG. 1 wherein additional engine components are shown in combination with the cooling system;

FIG. 3 is a schematic illustration of a water coolant bypass means responsive to intake manifold pressure for use in the system illustrated in FIG. 2; and FIG. 4 is a schematic illustration of yet another embodiment of the water coolant by-pass means responsive to manifold intake air temperature for use in a system illustrated in FIG. 2.

BEST MODE FOR CARRYING OUT THE INVENTION

Figure 1:
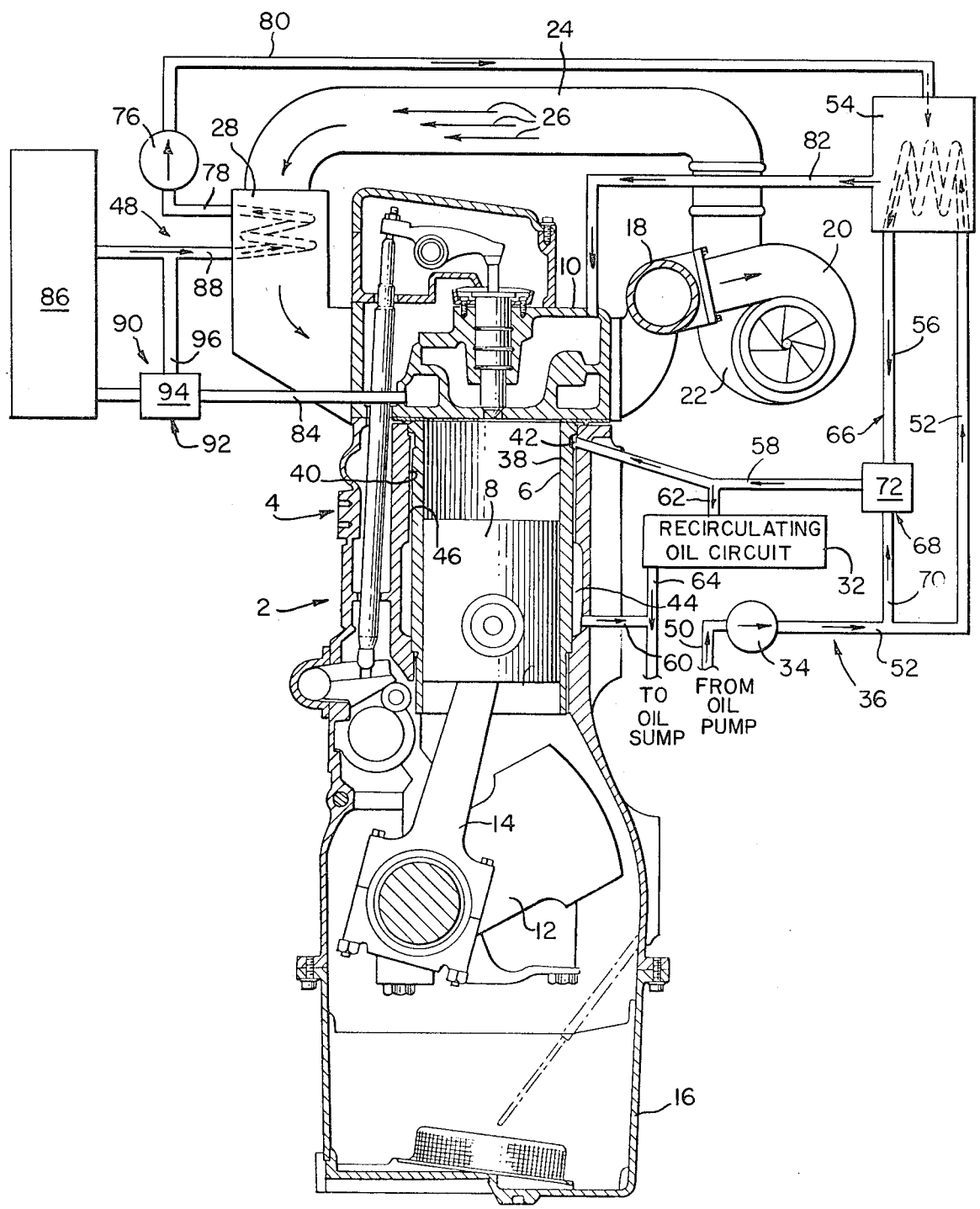
FIG. 1 is a combined cross-sectional view and schematic diagram illustrating an internal combustion engine equipped with a cooling system employing dual coolants in accordance with the subject invention.

For a complete understanding of a preferred embodiment of the subject invention, reference is initially made to FIG. 1 disclosing in cross-section an air breathing internal combustion engine 2 including a cylinder block 4 containing a plurality of cylinders 6 (only one of which is illustrated in FIG. 1) within which an engine piston 8 is mounted for reciprocating movement. The upper end of the engine cylinder 6 is closed by an engine head 10 through which fuel and air is supplied to the cylinder. Exhaust gases are removed from the cylinder through exhaust passages (not illustrated) contained in head 10. Piston 8 is connected to a rotating crankshaft 12 by means of a connecting rod 14. To the lower end of cylinder block 4, an oil pan 16 is mounted for forming a sump for engine lubrication oil.

The engine of FIG. 1 is of the turbo charged type wherein exhaust gases collected by the exhaust manifold 18 from the engine head 10. The collected exhaust gases are supplied to an exhaust gas turbine 20 which drives, in turn, an air compressor 22 which supplies air under pressure to the inlet ports (not illustrated). Thereafter the compressed air follows the path illustrated by arrows 26 to pass through aftercooler 28 designed to reduce the temperature of the compressed air before it enters the engine cylinders through intake passages (not illustrated) in the engine head 10. Aftercoolers benefit the operation of the engine by increasing the density of intake air to increase the efficiency and power output of an internal combustion engine equipped therewith.

In a turbocharged engine equipped with an aftercooler, it is common to employ the engine coolant as the recipient heat exchange medium for cooling the compressed air in the aftercooler. The need to provide low temperature cooling to the aftercooler while simultaneously providing a higher constant level temperature control for the engine lubrication oil has in the past lead to the development of complicated dual loop cooling systems. The subject invention seeks to provide the benefits normally associated with dual loop cooling systems while providing significant simplification, reduced power consumption, and increased performance. This improved result is achieved in part by utilizing components forming a portion of the already existing recirculating oil lubrication system of the engine. In particular, most engines are normally equipped with a recirculating oil circuit such as circuit 32 for supplying lubrication oil to the engine bearings and other surfaces requiring lubrication. The recirculating oil circuit is normally supplied with oil under pressure by a lubrication pump such as pump 34 but, as will be explained hereinbelow, the normal flow passages have been modified to form a fluid circuit means 36 for passing the lubrication oil in heat exchange relationship with one or more engine cylinders to provide the primary coolant therefor.

In the engine illustrated in FIG. 1, engine cylinder 6 is formed by a liner 38 adapted to be received in a cylinder bore 40. The outer surface of liner 38 and the inner surface of cylinder bore 40 are configured to form an oil supply channel 42 at the upper end of cylinder 6 and an annular oil receiving channel 44 adjacent the central axial region of the liner with a cylindrical flow path 46 interconnecting the supply and receiving channels through which lubrication oil is caused to pass under laminar flow conditions. The precise configuration of the preferred oil flow passage surrounding each cylinder liner is described in greater detail in a copending patent application Ser. No. 149,332 filed May 13, 1980 in the names of John H. Stang et al. entitled Oil Cooled Internal Combustion Engine and assigned to the same assignee as the subject invention.

The second loop of the subject dual loop engine coolant system is formed by a second fluid circuit means 48 for passing a secondary coolant, such as water, through the aftercooler 28 in heat exchange relationship with the pressurized intake air supplied by turbocharger 20 and 22 and through the engine head 10 to control the temperature of the head and engine components mounted therein. An important feature of the subject invention is the discovery that significant emission abatement may be achieved by controlling the degree of cooling achieved by aftercooler 28 in proportion to the engine output torque. In particular, the second fluid circuit means 48 is designed to cause the intake air to be at its lowest temperature at maximum engine output torque and to be at its highest temperature at minimum engine output torque.

The manner by which both the first and second fluid circuit means are able to achieve the desired temperature control of the lubrication oil and the secondary coolant, respectively, will now be descibed in detail. Referring first to the first fluid circuit means 36, the lubrication pump 34 is designed to receive oil from an oil sump such as the oil pan 16 through passage 50. Pump 34 is designed to supply the lubrication oil under pressure through passage 52 to a heat exchanger 54 adapted to link the first and second fluid circuit means in heat exchange relationship. The heat exchanger means 54 will be described in greater detail hereinbelow. From heat exchanger means 54, the lubrication oil proceeds through passage 56 and passage 58 to supply the annular supply channel 42 surrounding the upper portion of each cylinder liner. After passing in heat exchange relationship with the cylinder liner, through passage 46 the lubrication oil exits through passage 60 for return to oil pan 16. The recirculating oil circuit 32 which operates to supply lubrication oil to the engine bearings and other surfaces requiring lubrication receives a portion of the temperature controlled lubrication oil supplied to passage 58 through a branch passage 62 and returns the lubrication oil to the oil sump through branch passage 64.

To achieve the desired temperature control of oil supplied to branch 58, a first control means 66 is provided incorporating heat exchanger means 54 and further including an oil bypass means 68 for controlling the flow of lubrication oil around the heat exchanger means dependent on oil temperature thereby controlling the amount of heat which flows from the lubrication oil into the secondary coolant of the second fluid circuit means 48. The oil bypass means 68 includes a bypass passage 70 connected at one end with passage 52 and a control valve 72 operable in response to a control signal to modulate the amount of lubrication oil allowed to flow through the heat exchanger 54. For example, a temperature sensor may be provided to sense the temperature of oil in passage 58 to control in a feedback manner the setting of control valve 72 to thereby control the amount of lubrication of oil allowed to pass through heat exchanger means 54. Because the desired temperature of the lubrication oil will always be above the temperature of the secondary coolant passing through heat exchanger 54, the amount of lubrication oil allowed to pass through heat exchanger 54 will provide a simple mechanism for maintaining the temperature of the lubrication oil at the desired level. Thus, the coolant within circuit means 48 need never be relied upon to provide heat to the lubrication oil, as is often the situation in conventional engines, to avoid the problems associated with condensation of blow-by gases referred to above. By utilizing the lubrication oil as the primary coolant for the engine cylinders, elevation of the lubrication oil to the desired operating temperature is achieved very quickly following start up of a cold engine. In most engines the ideal lubrication oil temperature would be between 200°-250° F. range. In engines manufactured by the assignee of the invention, the overall ideal operating temperature for lubrication oil would be in the 210°-230° F. range. Moreover, the utilization of the already existing engine lubrication pump reduces significantly the capital cost of providing a dual loop coolant system for the engine.

Referring now in greater detail to the second fluid circuit means 48 illustrated in FIG. 1, a coolant pump 76 is designed to receive coolant exiting from the aftercooler 28 through passage 78 and to supply the coolant under pressure to passage 80 for flow through the heat exchanger means 54 referred to above. From heat exchanger means 54 the secondary coolant proceeds through passage 82 to the engine head 10 for movement through internal passages formed therein afterwhich the coolant exits through passage 84.

The points of entry and exit for the coolant are illustrated schematically in FIG. 1 although the actual points of entry and exit would not be as shown. Coolant in passage 84 is next supplied to a second control means 90 designed to control the temperature of the pressurized intake air supplied to the engine by modulating the temperature of the secondary coolant passing through the aftercooler in heat exchange relationship with the pressurized intake air. The second control means 90 includes radiator means 86 for transferring heat out of the secondary coolant into the ambient environment and a secondary coolant bypass means 92 for controlling the flow of the secondary coolant around the radiator means to achieve the desired temperature modulation of the secondary coolant supplied to the aftercooler.

The secondary coolant bypass means includes a secondary coolant flow control valve 94 and bypass branch 96 connected at one end to passage 88 whereby control valve 94 responds to a control signal to cause coolant received from passage 84 to flow either to the radiator means 86 or to passage 88 through bypass branch 96 in proportion to the control signal. As will be described in greater detail below, the control signal is arranged to cause the intake air to be at its low temperature at maximum engine output torque and at its highest temperature at minimum engine output torque. Any one of a variety of different types of engine condition sensors and flow control valves may be employed to achieve the desired results. For example flow control valve 94 may respond to a signal representative of engine water outlet temperature received in passage 84. Alternatively, valve 94 may respond to a signal representative of intake manifold pressure. Still other possibilities would be to control valve 94 in response to a signal representative of compressor discharge air temperature, fuel rail pressure or fuel pump rack position.

Any one of these techniques could be employed because the derived signal is responsive to the engine output torque in a predictable fashion wherein a response curve relates the sensed condition to the engine output torque. Through a proper electrical or mechanical control mechanism, the flow control valve could be adjusted to cause the temperature of the secondary coolant supplied to the aftercooler 28 to be varied in a manner to cause the inake air to be at its lowest temperature at maximum engine output torque and to be at its highest temperature at minimum engine output torque. Operation of an engine in accordance with this scheme will provide the highest power capability when required while at the same time generally resulting in the intake air being heated somewhat following prolonged periods of idling. The advantage resulting from the heating of the intake air at zero torque is that "white smoke" emissions and unburned hydrocarbons are reduced. The system will also serve to suppress production of nitric oxide at full power.

The disclosed system has particular advantages when applied to turbocharged, aftercooled engines but may also be applied to any internal combustion engine employing a recirculating lubrication system wherein it is desired to maintain the lubrication oil at a high and fairly constant level while providing a variable temperature coolant to another engine component whose temperature must be modulated under various engine operating conditions in order to achieve a desired engine performance.

Referring now to FIG. 2, a more schematic illustration of the temperature control apparatus of the subject invention is disclosed in combination with a variety of additional engine and vehicle components. Various elements referred to in FIG. 1 that also appear in FIG. 2 are identified by the same reference numerals. As can be seen clearly in FIG. 2, the first fluid circuit means 36 includes the flow passage 50, lubrication pump 34 and first control means 66 formed by heat exchanger 54, passage 56 and oil bypass means 68 formed by bypass passage 70 and flow control valve 72. Flow through the first fluid circuit is completed by passage 58 and the passages contained within block 4 which causes lubrication oil to pass in heat exchange relationship with the cylinders contained within block 4. As was discussed above, flow control valve 72 is operated by a temperature sensitive control mechanism (not illustrated) which is adapted to permit flow through the heat exchanger and passage 56 only when the lubrication oil has or is reaching a predetermined operating level.

The second fluid circuit means 48 is clearly shown in FIG. 2 and includes a recirculation path formed by coolant pump 76, passage 80, heat exchanger 54, passage 82, head 10, passage 84, second control means 90, passage 88, aftercooler 28 and passage 78 for returning coolant to pump 76. If the disclosed system is designed for operation with a vehicle engine, an air compressor 98 may be placed in the flow passage 80 to receive coolant from the recirculation path and a cab heater 100 may be placed in passage 84 or other locations to provide heat to the cab of the vehicle. A make-up tank 102 may be connected in a variety of places such as in fluid communication with passage 78 to replenish coolant which may leak or evaporate from the system.

As noted above, the secondary coolant bypass means 92 formed by flow valve 94 and bypass passage 96 operates to control the temperature of coolant supplied to aftercooler 28 in a manner to control the temperature of the pressurized intake air supplied to the engine to cause the intake air to be at its lowest temperature at maximum engine output torque and to be at its highest temperature at minimum engine output torque. A variety of control means may serve this purpose such as providing a flow control valve 94 which responds to a signal derived from a temperature sensor 104 arranged to sense the temperature of the water coolant discharged from the engine such as the water flowing through passage 84. The temperature of water flowing at this point in the recirculation path is known to have a predetermined relationship with the engine torque output at any given time. Accordingly, it is possible to design the control mechanism for flow control valve 94 to have a response curve which causes the temperature of coolant passing into aftercooler 28 to be at a temperature which causes the intake air to have its lowest temperature at the maximum engine output torque and its lowest temperature at the minimum engine output torque.

An alternative arrangement for construction of the secondary coolant bypass means is illustrated in FIG. 3 wherein a manifold pressure sensor 106 is provided for sensing the pressure of air in the intake manifold to produce a signal which operates flow control valve 94′ in a manner to produce the desired effect of causing the intake air to be at its lowest temperature at maximum engine output torque and at its highest temperature at minimum engine output torque. Again the intake manifold air pressure is known to have a predetermined relationship to engine output torque. Accordingly, the control mechanism (not illustrated) for flow control valve 94' may have a response curve which is capable of receiving the indication of intake manifold pressure produced by sensor 106 and controlling therefrom the flow control valve 94' to produce the desired results.

FIG. 4 illustrates yet another embodiment of the secondary coolant bypass means 92 in which a compressor discharge air temperature sensor 108 is provided to produce a control signal representative of compressor discharge air temperature which again is known to have a predetermined relationship with engine output torque so as to allow the flow control valve 94" to respond in a way to produce the desired temperature modulation of the intake air. When using the control schemes illustrated in FIGS. 3 and 4, an override control may be included in the system to prevent cooling when the oil sump temperature is below 170° F. Moreover, as it can be readily recognized, the response of the second fluid circuit means 48 will be unique dependent upon the control scheme for operating flow control valve 94, 94' or 94". The actual values will be functions of thermal inertia of engine components and actual valve designs. It is expected that the control system illustrated in FIG. 3 which is responsive to intake manifold pressure would have the fastest response to a change in engine operation and the control system of FIG. 2 wherein the valve 94 operates in response to water coolant temperature would have the slowest response. Predictions for the performance of a cooling system designed in accordance with the subject invention in the form appearing in FIG. 2 are contained in the following table for an engine identified as a Cummins N14 engine having up to 350 BHP manufactured by the assignee of this application, the Cummins Engine Co., Inc., Columbus, Ind. For purposes of the prediction, the aftercooler was assumed to operate with an efficiency of 0.95, the radiator was assumed to operate at an efficiency of 0.75 and was assumed to be of the multiple pass, 1200 sq. in. by 3 to 4 inch thickness with an expected pressure drop of 10 PSIG. The heat exchanger was assumed to operate at an efficiency of 0.44, the secondary coolant (water) pump was of the type designed to provide 11 to 12 GPM with a pressure boost of 25 PSI. The lubrication pump was of the type designed to provide 40 GPM and the lubrication oil flow control valve was of the type designed to provide full opening at 212° to 220° F. The flow control valve 94 was of the type designed to be fully opened at 180° to 195° F.

| Speed RPM | Torque Ft-Lbs | Circuit 48 Water Flow, GPM | Aftercooler Air In Temp., °F. | Engine Water Out Temp., °F. | Aftercooler Water In Temp., °F. | Intake Manifold Air Temp., °F. |
|---|---|---|---|---|---|---|
| 60 | 0 | 2.9 | 85 | 180 | 179 | 179 |
| 1300 | 0 | 6.2 | 94 | 180 | 180 | 179 |
| 1300 | 290 | 7.3 | 126 | 182 | 160 | 160 |
| 1300 | 580 | 8.0 | 166 | 185 | 141 | 142 |
| 1300 | 870 | 7.7 | 205 | 188 | 124 | 125 |
| 1300 | 1160 | 7.5 | 245 | 194 | 102 | 104 |
| 1900 | 0 | 9.7 | 132 | 180 | 170 | 169 |
| 1900 | 240 | 10.8 | 168 | 180 | 155 | 155 |
| 1900 | 480 | 11.7 | 212 | 183 | 139 | 139 |
| 1900 | 720 | 11.4 | 256 | 187 | 126 | 128 |
| 1900 | 965 | 11.0 | 304 | 200 | 109 | 115 |

As shown in the above table, the manifold air temperature is a low 115° F. at full power while at idle conditions the intake temperature rises to 179° F. This system will serve to suppress production of exhaust emissions by lowering nitric oxide at full power and hydrocarbons and white smoke at part or idle power. To insure the desired results, the flow rates in the circuit 48 must be adjusted to the levels indicated to allow the very low after cooler-water-in temperature under full cooling (power) conditions.

Industrial Applicability

While the disclosed system would have very broad application to virtually any type of internal combustion engine, particular advantages derive from its application to heavy duty, compression ignition engines used in over-the-road vehicle applications. A wide variety of additional applications include marine, and electrical power generation sets.

We claim:

1. A temperature control apparatus for an air breathing internal combustion engine having a cylinder block, a recirculating lubrication oil circuit containing lubrication oil, a compressor for pressurizing engine intake air, and an aftercooler for modifying the temperature of the pressurized intake air as it passes into the engine, said temperature control apparatus comprising:
    (a) first fluid circuit means for passing the lubrication oil in heat exchange relationship with one or more engine cylinders to provide the primary coolant for the engine cylinders, said first circuit means including first control means for maintaining the temperature of the lubrication oil at a first level which is relatively constant for substantially all engine operating conditions; and
    (b) second fluid circuit means for passing secondary coolant distinct from the lubrication oil through the aftercooler in heat exchange relationship with the pressurized intake air, said second circuit means including second control means responsive to a control signal for controlling the temperature of the pressurized intake air supplied to the engine by modulating the temperature of the secondary coolant supplied to the aftercooler in proportion to engine output torque, said second control means including signal generating means for producing said control signal in response to an operating condition of the engine indicative of engine output torque to cause the intake air to be at its lowest temperature at maximum engine output torque for optimum engine efficiency and to be at its highest temperature at a minimum engine output torque for minimizing white smoke generation.

2. Apparatus as defined in claim 1, wherein said first control means includes a heat exchanger means for linking said first and second fluid circuit means in heat exchange relationship and oil by-pass means for controlling the flow of lubrication oil around said heat exchanger means for causing heat to flow only from the lubrication oil into the secondary coolant as necessary to maintain a desired temperature.

3. Apparatus as defined in claim 2, wherein said oil by-pass means includes an oil flow control valve operated in response to the lubrication oil temperature.

4. Apparatus as defined in claim 2, wherein said second control means includes a radiator means for transferring heat out of the secondary coolant into the ambient environment and secondary coolant by-pass means for controlling the flow of secondary coolant around said radiator means to achieve the desired temperature modulation of the secondary coolant supplied to the aftercooler.

5. Apparatus as defined in claim 4, wherein said secondary coolant by-pass means includes a secondary coolant flow control valve operated in response to engine output torque to control the flow of secondary coolant around said radiator means.

6. Apparatus as defined in claim 5, wherein said secondary coolant by-pass means includes said signal generating means which is a secondary coolant temperature sensing means for sensing the temperature of the secondary coolant for controlling said secondary coolant flow control valve in accordance with a predetermined response curve which relates sensed temperature to engine torque in a manner to cause said flow control valve to adjust the temperature of the secondary coolant supplied to the aftercooler to cause the intake air to be cooled by the aftercooler at maximum engine output torque and to be heated by the aftercooler at minimum engine output torque.

7. Apparatus as defined in claim 5, wherein said secondary coolant by-pass means includes said signal generating means which is a compressor discharge temperature sensing means for sensing the compressor discharge air temperature and for controlling said secondary coolant flow control valve in accordance with a predetermined response curve which relates sensed pressure to engine torque in a manner to cause said flow control valve to adjust the temperature of the secondary coolant supplied to the aftercooler to cause the intake air to be cooled by the aftercooler at maximum engine output torque and to be heated by the aftercooler at minimum engine output torque.

8. Apparatus as defined in claim 5, wherein said secondary coolant by-pass means includes said signal generating means which is a pressure means for sensing the intake air pressure and for controlling said secondary coolant flow control valve in accordance with a predetermined response curve which relates sensed pressure to engine torque in a manner to cause said flow control valve to adjust the temperature of the secondary coolant supplied to the aftercooler to cause the intake air to be cooled by the aftercooler at maximum engine output torque and to be heated by the aftercooler at minimum engine output torque.

9. Apparatus as defined in claim 4, wherein said oil by-pass means includes an oil flow control operated in response to the lubrication oil temperature.

10. Apparatus as defined in claim 9, for use with an internal combustion engine having an engine head wherein said second fluid circuit means includes a recirculation path for bringing secondary coolant into heat exchange relationship sequentially with the engine head, said radiator means, the aftercooler and said heat exchanger means.

11. A temperature control apparatus for an air breathing internal combustion engine having a cylinder block, a recirculating lubrication oil circuit containing lubrication oil, a compressor for pressurizing engine intake air, and an aftercooler for modifying the temperature of the pressurized intake air as it passes into the engine, said temperature control apparatus comprising:

(a) first fluid circuit means for passing the lubrication oil in heat exchange relationship with one or more engine cylinders to provide the primary coolant for the engine cylinders, said first circuit means including first control means for maintaining the temperature of the lubrication oil at a first level which is relatively constant for substantially all engine operating conditions, wherein said first control means includes a heat exchanger means for linking said first and second fluid circuit means in heat exchange relationship and oil by-pass means for controlling the flow of lubrication oil around said heat exchanger means for causing heat to flow only from the lubrication oil into the secondary coolant as necessary to maintain a desired temperature; and (b) second fluid circuit means for passing secondary coolant distinct from the lubrication oil through the aftercooler in heat exchange relationship with the pressurized intake air, said second circuit means including second control means for controlling the temperature of the pressurized intake air supplied to the engine by modulating the temperature of the secondary coolant supplied to the aftercooler in proportion to engine output torque to cause the intake air to be at its lowest temperature at maximum engine output torque and to be at its highest temperature at minimum engine output torque, said second control means includes a radiator means for transferring heat out of the secondary coolant into the ambient environment and secondary coolant by-pass means for controlling the flow of secondary coolant around said radiator means to achieve the desired temperature modulation of the secondary coolant supplied to the aftercooler, said secondary coolant by-pass means includes a secondary coolant flow control valve operated in response to engine output torque to control the flow of secondary coolant around said radiator means and pressure means for sensing the intake air pressure and for controlling said secondary coolant flow control valve in accordance with a predetermined response curve which relates sensed pressure to engine torque in a manner to cause said flow control valve to adjust the temperature of the secondary coolant supplied to the aftercooler to cause the intake air to be at its lowest temperature at maximum engine output torque and to be at its highest temperature at minimum engine output torque.

12. A temperature control apparatus for an air breathing internal combustion engine having a cylinder block, a compressor for pressurizing engine intake air, and an aftercooler for modifying the temperature of the pressurized intake air as it passes into the engine, said temperature control apparatus comprising:

(a) first fluid circuit means for passing first coolant in heat exchange relationship with one or more engine cylinders to provide the primary coolant for the engine cylinders, said first circuit means including first control means for maintaining the temperature of the first coolant at a first level which is relatively constant for substantially all engine operating conditions; and (b) second fluid circuit means for passing secondary coolant distinct from the first coolant through the aftercooler in heat exchange relationship with the pressurized intake air, said second circuit means including second control means responsive to a control signal for controlling the temperature of the pressurized intake air supplied to the engine by modulating the temperature of the secondary coolant supplied to the aftercooler in proportion to engine output torque, said second control means including signal generating means for producing said control signal in response to an operating condition of the engine indicative of engine output torque to cause the intake air to be cooled by the aftercooler to its lowest temperature at maximum engine output torque and to be heated by the aftercooler to its highest temperature at minimum engine output torque.

* * * * *